United States Patent
Montero et al.

(10) Patent No.: US 11,016,755 B2
(45) Date of Patent: May 25, 2021

(54) SYSTEM AND METHOD TO SECURE EMBEDDED CONTROLLER FLASHING PROCESS

(71) Applicant: Dell Products L.P., Round Rock, TX (US)

(72) Inventors: Adolfo S. Montero, Pflugerville, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/527,216

(22) Filed: Jul. 31, 2019

(65) Prior Publication Data

US 2021/0034355 A1 Feb. 4, 2021

(51) Int. Cl.
*G06F 21/55* (2013.01)
*G06F 9/44* (2018.01)
(Continued)

(52) U.S. Cl.
CPC ............ *G06F 8/654* (2018.02); *G06F 3/0607* (2013.01); *G06F 3/0647* (2013.01);
(Continued)

(58) Field of Classification Search
CPC ...... G06F 21/552; G06F 21/53; G06F 21/572; G06F 21/575; G06F 21/566; G06F 8/654; G06F 8/65; G06F 11/1417; G06F 11/1433; G06F 3/0607; G06F 3/0647; G06F 3/0652; G06F 3/0679; G06F 9/44589; G06F 13/1673; G06F 8/71; G06F 8/64; G06F 3/0619; G06F 3/0659; G06F 3/0604;
(Continued)

(56) References Cited

U.S. PATENT DOCUMENTS 5,794,054 A * 8/1998 Le .......................... G06F 9/4401 710/240
5,819,087 A * 10/1998 Le .......................... G06F 9/4401 713/2

(Continued)

OTHER PUBLICATIONS

Lucille R. McMinn, External Verification of SCADA System Embedded Controller Firmware, Mar. 22, 2012, [Retrieved on Feb. 12, 2021], Retrieved from the internet: <URL: https://scholar.afit.edu/cgi/viewcontent.cgi?article=2138&context=etd> 100 Pages (1-100) (Year: 2012).*

(Continued)

*Primary Examiner* — Anibal Rivera
(74) *Attorney, Agent, or Firm* — Baker Botts L.L.P.

(57) ABSTRACT

Methods, systems, and computer programs for receiving, by an embedded controller (EC), an EC firmware update from a central processing unit (CPU); storing the EC firmware update into a buffer region of a flash memory medium via a first bus, the first bus communicatively coupling the EC and the flash memory medium; verifying the EC firmware update stored in the buffer region of the flash memory medium; and in response to verifying the EC firmware update: storing the verified EC firmware update into a primary region of the flash memory medium; and loading the verified EC firmware update from the primary region into an EC memory medium of the EC via the first bus.

17 Claims, 6 Drawing Sheets

(51) Int. Cl.
*G06F 8/654* (2018.01)
*G06F 13/16* (2006.01)
*G06F 3/06* (2006.01)
*G06F 9/445* (2018.01)
*G06F 21/57* (2013.01)
*H04L 9/32* (2006.01)
*G06F 8/65* (2018.01)
*G06F 8/71* (2018.01)
*G06F 13/40* (2006.01)

(52) U.S. Cl.
CPC .......... *G06F 3/0652* (2013.01); *G06F 3/0679* (2013.01); *G06F 9/44589* (2013.01); *G06F 13/1673* (2013.01); *G06F 21/572* (2013.01); *H04L 9/3236* (2013.01); *G06F 3/0659* (2013.01); *G06F 8/65* (2013.01); *G06F 8/71* (2013.01); *G06F 13/4027* (2013.01); *G06F 13/4045* (2013.01); *G06F 2221/033* (2013.01)

(58) Field of Classification Search
CPC .... G06F 3/0611; G06F 9/4887; G06F 9/4401; G06F 9/445; G06F 9/44594; G06F 9/4406; G06F 13/16; G06F 13/4027; G06F 13/4045; G06F 13/4282; G06F 21/52; G06F 21/57; G06F 21/64; G06F 21/577; G06F 21/26; G06F 21/606; G06F 2221/033; H04L 9/3236
See application file for complete search history.

(56) References Cited

U.S. PATENT DOCUMENTS

| | | | | |
|---|---|---|---|---|
| 6,357,021 B1* | 3/2002 | Kitagawa | G06F 8/65 | 714/38.1 |
| 6,708,231 B1* | 3/2004 | Kitagawa | G06F 8/65 | 710/10 |
| 7,171,658 B2* | 1/2007 | Ha | G06F 8/65 | 711/102 |
| 9,477,458 B2* | 10/2016 | Asselin | G06F 11/1433 | |
| 9,891,996 B2* | 2/2018 | Gopal | G06F 11/1417 | |
| 10,678,529 B1* | 6/2020 | Farhan | H04L 67/34 | |
| 10,733,288 B2* | 8/2020 | Jeansonne | G06F 9/4406 | |
| 2002/0166061 A1* | 11/2002 | Falik | G06F 12/1425 | 726/34 |
| 2004/0030877 A1* | 2/2004 | Frid | G06F 8/654 | 713/1 |
| 2004/0040019 A1* | 2/2004 | Ha | G06F 8/65 | 717/168 |
| 2004/0076043 A1* | 4/2004 | Boals | G06F 11/1417 | 365/200 |
| 2005/0177709 A1* | 8/2005 | Kim | G06F 8/65 | 713/1 |
| 2006/0075276 A1* | 4/2006 | Kataria | G06F 11/1433 | 714/47.1 |
| 2006/0085564 A1* | 4/2006 | Bomhoff | G06F 8/65 | 710/8 |
| 2006/0282653 A1* | 12/2006 | Chu | G06F 8/654 | 713/1 |
| 2007/0050465 A1* | 3/2007 | Canter | G07F 9/026 | 709/209 |
| 2007/0143530 A1* | 6/2007 | Rudelic | G06F 21/57 | 711/103 |
| 2008/0086652 A1* | 4/2008 | Krieger | G06F 1/26 | 713/330 |
| 2008/0282023 A1* | 11/2008 | Biswas | G06F 12/0246 | 711/103 |
| 2009/0187699 A1* | 7/2009 | Cho | G06F 12/0246 | 711/102 |
| 2009/0271533 A1* | 10/2009 | Asnaashari | G06F 8/654 | 710/13 |
| 2009/0307392 A1* | 12/2009 | Mychalowych | G06F 13/4045 | 710/51 |
| 2010/0023777 A1* | 1/2010 | Prevost | G06F 21/572 | 713/180 |
| 2010/0191867 A1* | 7/2010 | Douglas | G06F 8/65 | 710/8 |
| 2012/0072734 A1* | 3/2012 | Wishman | G06F 21/572 | 713/189 |
| 2012/0117365 A1* | 5/2012 | Navy | G06F 21/572 | 713/2 |
| 2013/0013905 A1* | 1/2013 | Held | G06F 21/575 | 713/2 |
| 2013/0124888 A1* | 5/2013 | Tanaka | G11C 16/06 | 713/320 |
| 2013/0124932 A1* | 5/2013 | Schuh | G11C 29/08 | 714/718 |
| 2013/0263262 A1* | 10/2013 | Forristal | G06F 21/577 | 726/22 |
| 2014/0068585 A1* | 3/2014 | Young | G06F 8/65 | 717/168 |
| 2014/0068594 A1* | 3/2014 | Young | G06F 21/572 | 717/172 |
| 2014/0156872 A1* | 6/2014 | Buer | G06F 21/602 | 710/8 |
| 2014/0189669 A1* | 7/2014 | Asselin | G06F 8/65 | 717/168 |
| 2014/0208047 A1* | 7/2014 | Vembu | G06T 1/60 | 711/161 |
| 2014/0233732 A1* | 8/2014 | Buer | H04N 21/2543 | 380/200 |
| 2014/0297922 A1* | 10/2014 | Sarangdhar | G06F 13/16 | 711/103 |
| 2015/0067314 A1* | 3/2015 | Strauss | G06F 21/572 | 713/2 |
| 2015/0280471 A1* | 10/2015 | Farhi | H02J 7/0071 | 320/107 |
| 2015/0355696 A1* | 12/2015 | Pamley | G06F 1/3203 | 713/300 |
| 2015/0356034 A1* | 12/2015 | Pamley | G06F 13/4027 | 710/308 |
| 2016/0019116 A1* | 1/2016 | Gopal | G06F 11/1417 | 714/19 |
| 2016/0055068 A1* | 2/2016 | Jeansonne | G06F 3/0619 | 714/15 |
| 2016/0055332 A1* | 2/2016 | Jeansonne | G06F 21/575 | 726/22 |
| 2016/0063254 A1* | 3/2016 | Jeansonne | G06F 21/606 | 713/2 |
| 2016/0063255 A1* | 3/2016 | Jeansonne | G06F 21/572 | 713/2 |
| 2016/0306977 A1* | 10/2016 | Zarakas | H04L 63/123 | |
| 2016/0350538 A1* | 12/2016 | Young | G06F 9/4406 | |
| 2017/0094377 A1* | 3/2017 | Herdrich | H04L 41/5009 | |
| 2017/0123721 A1* | 5/2017 | Sela | G06F 3/0611 | |
| 2017/0123722 A1* | 5/2017 | Sela | G06F 3/0604 | |
| 2017/0123991 A1* | 5/2017 | Sela | G11C 16/102 | |
| 2017/0126143 A1* | 5/2017 | White | H04L 67/18 | |
| 2017/0206077 A1* | 7/2017 | Kulkarni | G06F 1/1601 | |
| 2017/0249155 A1* | 8/2017 | Sundrani | G06F 9/4401 | |
| 2017/0255459 A1* | 9/2017 | Tanimoto | G06F 12/0246 | |
| 2017/0293484 A1* | 10/2017 | Haase | H04L 9/14 | |
| 2017/0300107 A1* | 10/2017 | Green | G06F 8/654 | |
| 2018/0165455 A1* | 6/2018 | Liguori | G06F 9/4406 | |
| 2018/0225459 A1* | 8/2018 | Zarakas | G06K 19/07381 | |
| 2018/0232521 A1* | 8/2018 | Jeansonne | G06F 21/52 | |
| 2018/0351749 A1* | 12/2018 | Chen | H04L 9/14 | |
| 2019/0042228 A1* | 2/2019 | Nolan | G06F 8/654 | |
| 2019/0042229 A1* | 2/2019 | Kotary | G06F 8/66 | |
| 2019/0129638 A1* | 5/2019 | Murali | G06F 3/0659 | |
| 2019/0179532 A1* | 6/2019 | Tseng | G11C 8/08 | |
| 2019/0179568 A1* | 6/2019 | Hsu | G11C 16/10 | |
| 2019/0179573 A1* | 6/2019 | Hsu | G11C 11/005 | |
| 2019/0227783 A1* | 7/2019 | Chang | G06F 8/65 | |
| 2019/0286483 A1* | 9/2019 | Chitnis | G06F 9/4887 | |
| 2019/0386966 A1* | 12/2019 | Ostrikov | H04L 63/0435 | |
| 2020/0082089 A1* | 3/2020 | Strong | H04L 9/3249 | |
| 2020/0201692 A1* | 6/2020 | Kachare | G06F 9/44594 | |
| 2020/0293298 A1* | 9/2020 | Harris | G06F 13/4282 | |

(56) References Cited

U.S. PATENT DOCUMENTS

OTHER PUBLICATIONS

Dennis K. Nilsson et al., A Framework for Self-Verification of Firmware Updates over the Air in Vehicle ECUs, 2008 IEEE, [Retrieved on Feb. 12, 2021], Retrieved from the internet: <URL: https://ieeexplore.ieee.org/stamp/stamp.jsp?tp=&arnumber=4746641> 5 Pages (1-5) (Year: 2008).*

* cited by examiner

SYSTEM AND METHOD TO SECURE EMBEDDED CONTROLLER FLASHING PROCESS

BACKGROUND

Field of the Disclosure

This disclosure relates generally to information handling systems, and in particular to securing an embedded controller flashing process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method for securing an embedded controller flashing process in a computing environment, where the method includes receiving, by an embedded controller (EC), an EC firmware update from a central processing unit (CPU); storing the EC firmware update into a buffer region of a flash memory medium via a first bus, the first bus communicatively coupling the EC and the flash memory medium; verifying the EC firmware update stored in the buffer region of the flash memory medium; and in response to verifying the EC firmware update: storing the verified EC firmware update into a primary region of the flash memory medium; and loading the verified EC firmware update from the primary region into an EC memory medium of the EC via the first bus.

In one or more of the disclosed embodiments, storing the EC firmware update into the buffer region of the flash memory medium via the first bus comprises: causing a high impedance state in an output port of a platform controller hub (PCH); bypassing a second bus, the second bus communicatively coupling the EC and the PCH; and accessing the buffer region of the flash memory medium via the first bus communicatively coupling the EC and the flash memory medium.

In one or more of the disclosed embodiments, causing the high impedance state in the output port of the PCH comprises resetting the PCH.

In one or more of the disclosed embodiments, loading the verified EC firmware update from the primary region into the EC memory medium of the EC further comprises: reverifying the verified EC firmware update, the reverifying responsive to an EC reboot.

In one or more of the disclosed embodiments, the method further comprises: determining that the verified EC firmware update cannot be reverified; and in response to determining that the verified EC firmware update cannot be reverified: causing a recovery mode comprising: loading recovery software stored in a secondary region of the flash memory medium; accessing a copy of the verified EC firmware update stored in the buffer region of the flash memory medium using the recovery software; reverifying the copy of the verified EC firmware update stored in the buffer region of the flash memory medium; and storing the reverified copy of the verified EC firmware update into the primary region of the flash memory medium.

In one or more of the disclosed embodiments, the method further comprises: determining that the EC firmware update in the buffer region of the flash memory medium cannot be verified; and deleting the EC firmware update from the buffer region of the flash memory medium.

In one or more of the disclosed embodiments, verifying the EC firmware update in the buffer region comprises performing a cryptographic function.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method and a system to secure an embedded controller flashing process in a computing environment. Specifically, this document describes receiving, by an embedded controller (EC), an EC firmware update from a central processing unit (CPU); storing the EC firmware update into a buffer region of a flash memory medium via a first bus, the first bus communicatively coupling the EC and the flash memory medium; verifying the EC firmware update stored in the buffer region of the flash memory medium; and in response to verifying the EC firmware update: storing the verified EC firmware update into a primary region of the flash memory medium; and loading the verified EC firmware update from the primary region into an EC memory medium of the EC via the first bus.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
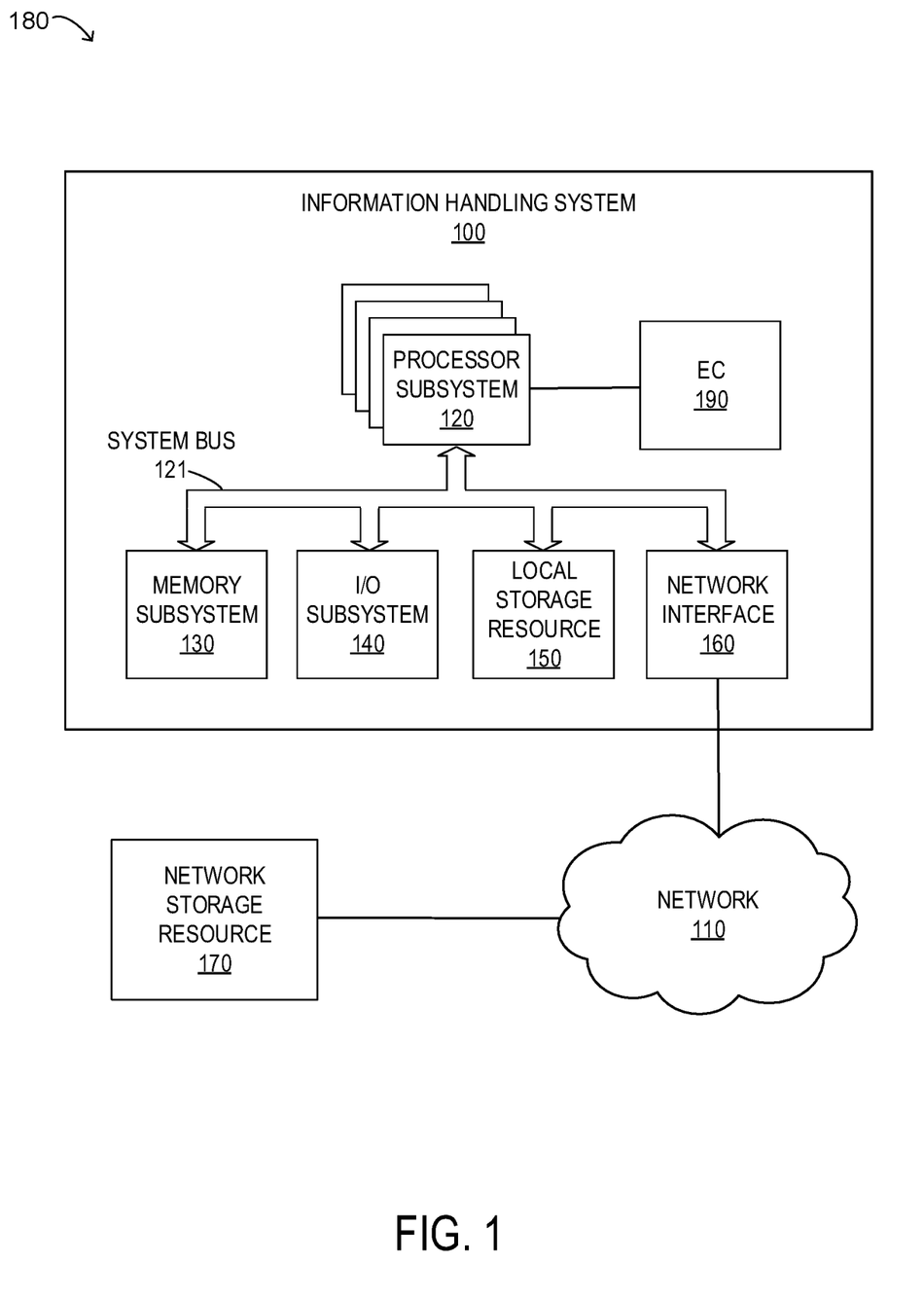
FIG. 1 illustrates a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, an embedded controller (EC) 190, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, Enhanced Serial Peripheral Interface (eSPI) bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
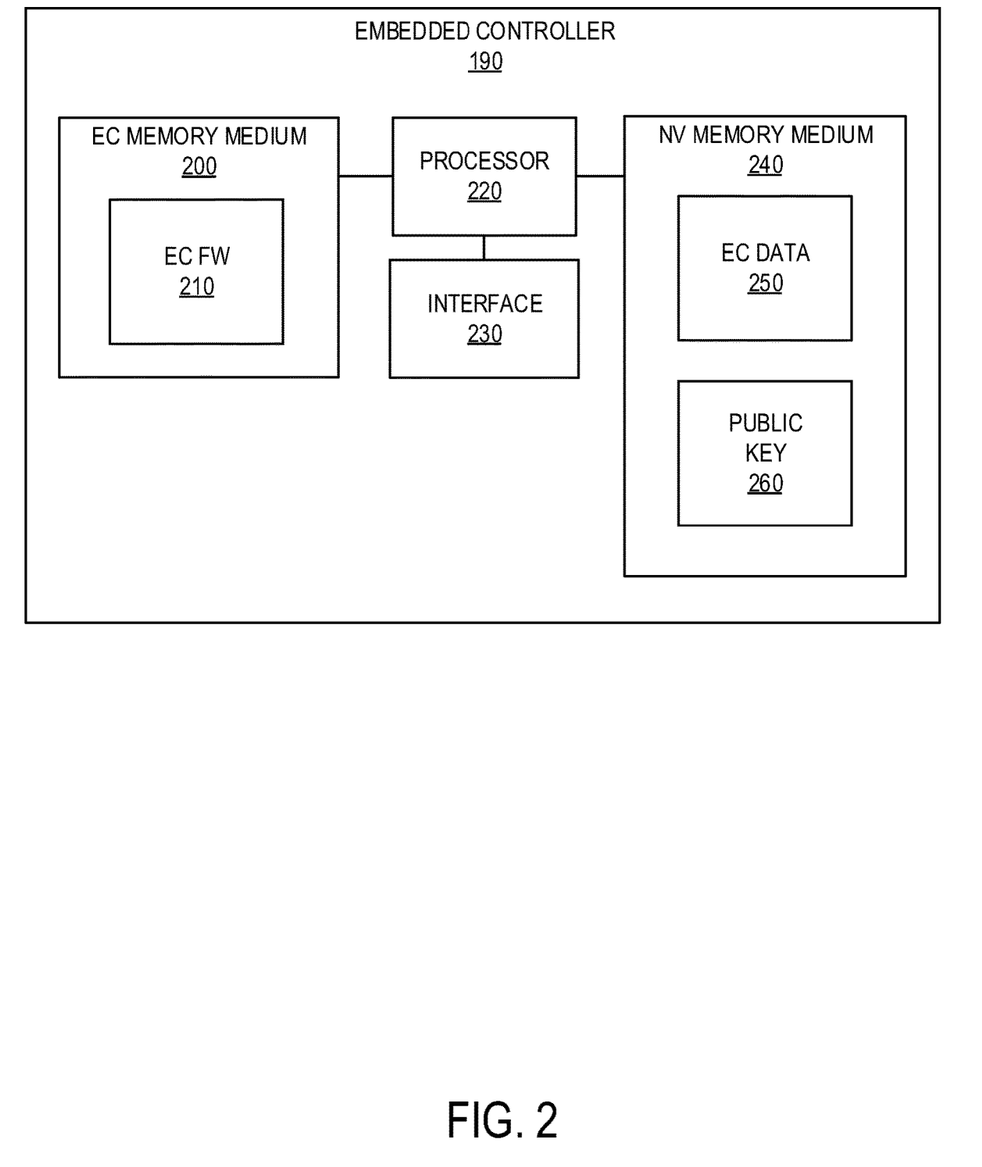
FIG. 2 illustrates a block diagram of selected elements of an embodiment of an embedded controller.

FIG. 2 illustrates a block diagram of selected elements of an embodiment of an embedded controller. In the example illustrated in FIG. 2, EC 190 may include an EC memory medium 200, a processor 220, an interface 230, and a non-volatile (NV) memory medium 240. EC memory medium 200 may include EC firmware (FW) 210. NV memory medium 240 may include EC data 250 and public key 260.

In one or more embodiments, EC memory medium 200 can include circuitry that enables storing firmware used by EC 190 to manage IHS 100. In particular, EC memory medium 200 may comprise a volatile memory medium (e.g., RAM) used to store EC FW 210 such that EC 190 can perform various management tasks on behalf of IHS 100. When executed by EC 190, EC FW 210 may provide low-level control for specific hardware of IHS 100. For example, EC memory medium 200 can store EC FW 210 that allows EC 190 to process signals from I/O devices, allow remote diagnostics and remediation over network 110, and reset devices such as the platform controller hub (PCH).

In one or more embodiments, processor 220 may execute instructions in accordance with one or more of systems, flowcharts, methods, and/or processes described herein. For example, EC memory medium 200 and/or NV memory medium 240 may store instructions, or EC data 250, that may be executable in accordance with one or more of systems, flowcharts, methods, and/or processes described herein. In one or more embodiments, processor 220 may utilize EC data 250. In one example, processor 220 may utilize EC data 250 via EC memory medium 200. In another example, one or more portions of EC data 250 may be transferred to EC memory medium 200, and processor 220 may utilize EC data 250 via EC memory medium 200.

In one or more embodiments, interface 230 may include circuitry that enables communicatively coupling EC 190 to one or more devices. In one example, interface 230 may include circuitry that enables communicatively coupling EC 190 to one or more buses. In a second example, interface 230 may include circuitry that enables one or more interrupt signals to be received. In one instance, interface 230 may include general purpose input/output (GPIO) circuitry, and the GPIO circuitry may enable one or more interrupt signals to be received and/or provided via at least one interrupt line. In another example, interface 230 may include GPIO circuitry that may enable EC 190 to provide and/or receive signals associated with other circuitry (e.g., diagnostic circuitry, etc.). In a third example, interface 230 may include circuitry that enables communicatively coupling to one or more networks, such as network 110. In one instance, interface 230 may include circuitry that enables communicatively coupling to network interface 160. In another example, interface 230 may include a network interface.

In one or more embodiments, NV memory medium 240 may include circuitry that enables EC 190 to store instructions and verification mechanisms in a non-volatile manner. In particular, NV memory medium 240 may comprise read-only memory (ROM) used to store EC data 250 and public key 260 such that EC 190 can access, verify, load, and execute EC firmware updates. In one embodiment, EC data 250 may comprise EC boot instructions used to retrieve EC firmware stored in an external non-volatile storage medium (e.g., flash memory medium) and load the EC firmware into EC FW 210 of EC memory medium 200 for execution. In another embodiment, EC data 250 may comprise instructions used by EC 190 to verify EC firmware updates stored in an external non-volatile storage medium prior to loading the EC firmware updates into EC FW 210 for execution. In yet another embodiment, EC data 250 may comprise instructions used by EC 190 to access recovery software stored in an external non-volatile storage medium if EC 190 determines that an EC firmware update cannot be verified or if EC firmware becomes corrupted and can no longer be used. In one embodiment, EC 190 may use public key 260 to verify EC firmware updates. In particular, public key 260 may comprise an immutable public encryption key stored in NV memory medium 240 that may allow EC 190 to perform asymmetric cryptography with one or more private keys stored within an external storage medium, such as an EC firmware build server, for example. In one embodiment, asymmetric cryptography may be used to verify an EC firmware update stored in an external non-volatile storage medium prior to loading the EC firmware update into EC FW 210 for execution. In another embodiment, asymmetric cryptography may be used to reverify a previously verified EC firmware update stored in an external non-volatile storage medium upon EC reboot.

Figure 3:
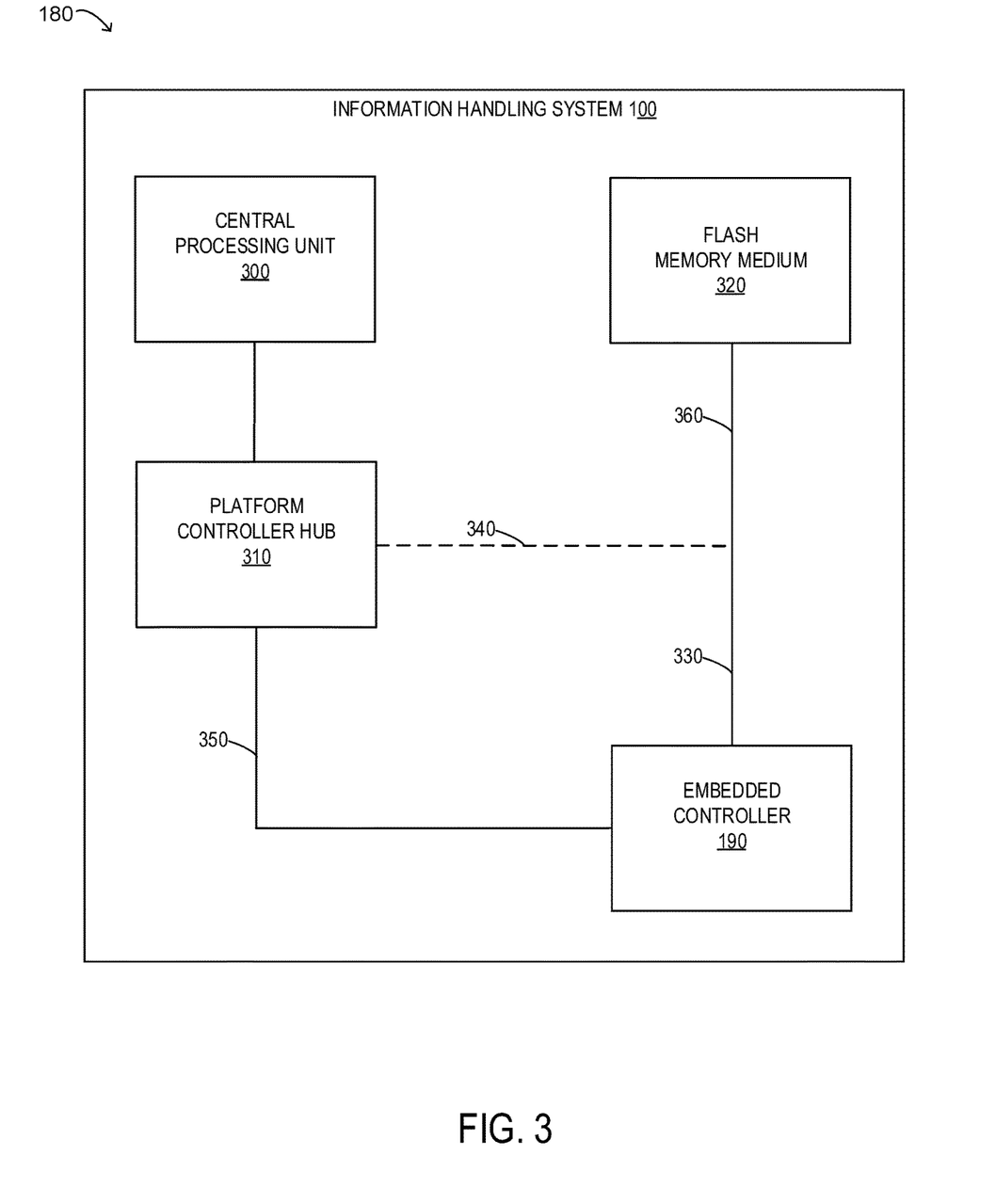
FIG. 3 illustrates a block diagram of selected elements of an embodiment of an information handling system that includes an embedded controller.

FIG. 3 illustrates a block diagram of selected elements of an embodiment of an information handling system that includes an embedded controller. In the embodiment illustrated in FIG. 3, IHS 100 includes a central processing unit (CPU) 300, a platform controller hub (PCH) 310, a flash memory medium 320, and EC 190. PCH 310 may be communicatively coupled to EC 190 via bus 350. PCH 310 may be communicatively coupled to flash memory medium 320 via bus 340 and bus 360 (collectively referred to herein as "bus 340"). EC 190 may be communicatively coupled to flash memory medium 320 via bus 330 and bus 360 (collectively referred to herein as "bus 330"). In one or more embodiments, bus 340 and bus 330 may be or include a Serial Peripheral Interface (SPI) bus. In one or more embodiments, bus 350 may be or include an Enhanced Serial Peripheral Interface (eSPI) bus. In other embodiments, buses 330, 340, and 350 may be or include a Low Pin Count (LPC) bus, a Peripheral Component Interconnect (PCI) bus, a PCI-Express bus, or any other suitable data connection for enabling communication between devices.

As depicted in FIG. 3, CPU 300 may comprise a system, device, or apparatus operable to implement an EC firmware update process. The EC firmware update process may include sending a flash command that includes an EC firmware update such that EC 190 may receive and store the EC firmware update. For example, CPU 300 may send an EC firmware update that includes a fix to an existing bug in EC FW 274 or that includes additional features used to manage IHS 100. In one embodiment, CPU 300 may send the flash command (including the EC firmware update) to flash memory medium 320 via PCH 310 and bus 340 to be stored for verification prior to being executed by EC 190. In another embodiment, CPU 300 may send the flash command to EC 190 via PCH 310 and bus 350. In this embodiment, EC 190 may restrict access to certain address spaces within flash memory medium 320 such that CPU 300 may not overwrite existing firmware stored within a region of flash memory medium 320 that has been previously verified for use by EC 190. This embodiment is described in further detail with regard to EC 190 below.

As depicted in FIG. 3, PCH 310 may comprise a system, device, or apparatus operable to support general-purpose input/output (GPIO) and enable communication between CPU 300, flash memory medium 320, and EC 190. In particular, PCH 310 can receive a flash command that includes an EC firmware update and route the flash command to be stored for verification by EC 190. In one embodiment, PCH 310 can receive the flash command from CPU 300 that includes an EC firmware update and can store the EC firmware update in flash memory medium 320 via bus 340. In another embodiment, PCH 310 can receive the flash command from CPU 300 and can send the EC firmware update included in the flash command to EC 190 via bus 350.

As depicted in FIG. 3, flash memory medium 320 may comprise a system, device, or apparatus operable to store EC firmware updates for verification prior to being loaded and executed by EC 190. In particular, flash memory medium 320 may be non-volatile memory that is partitioned into several regions such that each region may store software to be used by a particular device or process in IHS 100. Flash memory medium 320 may include a descriptor region that describes which process, or processes, may access a particular region such that all other processes not described for that region are restricted from accessing the region. For example, flash memory medium 320 may be partitioned to a basic input output system (BIOS) region, a management engine (ME) region, and an EC region.

In one embodiment, each region of flash memory medium 320 may be further partitioned into regions comprised of address spaces storing software restricted for the exclusive use of the process, or processes, to which the partition belongs. For example, an EC region of flash memory medium 320 may be further partitioned into a primary region, a secondary region, and a buffer region. The primary region may be used to store an EC boot image or an EC firmware update that has been verified for use (e.g., using asymmetric cryptography) by EC 190. In one embodiment, the secondary region may be used to store a backup copy of the EC boot image or EC firmware update such that it may be used by EC 190 in response to the EC boot image or EC firmware update in the primary region becoming corrupted or otherwise invalidated for use. In another embodiment, the secondary region may be used to store recovery software such that EC 190 may load and execute the recovery software to enter a recovery mode. Recovery software may provide instructions and support necessary for booting EC 190 (and in turn booting IHS 100). In particular, the recovery software may include instructions for accessing a verified EC boot image or EC firmware update that may allow EC 190 to complete a booting process. In one embodiment, recovery software may instruct EC 190 to retrieve an EC boot image or EC firmware update from CPU 300. In another embodiment, recovery software may instruct EC 190 to retrieve an EC boot image or EC firmware update from a separate external non-volatile storage medium in computing environment 180. The buffer region of flash memory medium 320 may be used to store an EC firmware update such that it may be verified by EC 190 prior to being executed. In this way, buffer region of flash memory medium 320 can be used to verify the integrity of each EC firmware update received from CPU 300. In one embodiment, flash memory medium 320 may support a serial peripheral interface (SPI) protocol.

As depicted in FIG. 3, EC 190 may comprise a system, device, or apparatus operable to access, verify, load, and execute EC firmware updates that allow EC 190 to manage specific hardware of IHS 100. In particular, EC 190 may receive a flash command from CPU 300 (via PCH 310) that includes an EC firmware update. Each EC firmware update may be verified by EC 190 to ensure that it does not include malicious code that might originate from a third-party, such as a hacker, researcher, or any other such person or entity attempting to gain unauthorized access to IHS 100. For example, EC 190 may validate EC firmware updates using SHA-256 to identify content typically used in a "Denial of Service" attack that might overtake IHS 100 from a user. To avoid directly executing an unverified EC firmware update, EC 190 can first store the unverified EC firmware update for verification before loading the EC firmware update into EC memory medium 200 for execution. Due to in part to limited address space in EC memory medium 200 (e.g., 420 KB), EC 190 may store the unverified EC firmware update in flash memory medium 320 for verification. In particular, EC 190 can store an unverified EC firmware update in the buffer region of flash memory medium 320 and can perform a verification process (e.g., code measurement, cryptographic hash functions, and the like) in order to verify the EC firmware update for use before moving it to the primary region of flash memory medium 320.

In one embodiment, EC 190 can store the EC firmware update in flash memory medium 320 via bus 350 and bus 340. This conventional data path may be used by EC 190 for both storing and loading EC firmware update to and from flash memory medium 320, respectively. EC 190 may send the EC firmware update to flash memory medium 320 via bus 350 and bus 340. In one embodiment, bus 350 may be an enhanced serial peripheral interface (eSPI) bus or any other bus meeting requirements such as low power, low pin count, medium bandwidth, real-time flash sharing, scalable bandwidth, and the like. In one embodiment, bus 340 may be a serial peripheral interface (SPI) bus or any other bus used for synchronous serial short-distance communication.

In one embodiment, EC 190 can store the EC firmware update in flash memory medium 320 directly via bus 330 (i.e., via bus 330 and bus 360) rather than via PCH 310. Here, EC 190 can reset PCH 310 to cause an output port of PCH 310 to enter a high impedance (Hi-Z) state. In particular, EC 190 may keep PCH 310 in a state of reset (e.g., tri-state) in order to effectively remove its output from buses 350 and 340. This is illustrated in FIG. 3 where a portion of bus 340 is dashed to indicate that PCH 310 is in a state of reset. EC 190 may use bus 330 to access flash memory medium 320 while PCH 310 is in tri-state. This allows EC 190 to use bus 330 directly without requiring PCH 310 to relay the EC firmware update and avoids using bus 350 which may save time and computational power. In addition, accessing flash memory medium 320 directly allows EC 190 to verify an EC firmware update prior to booting CPU 300.

Figure 4:
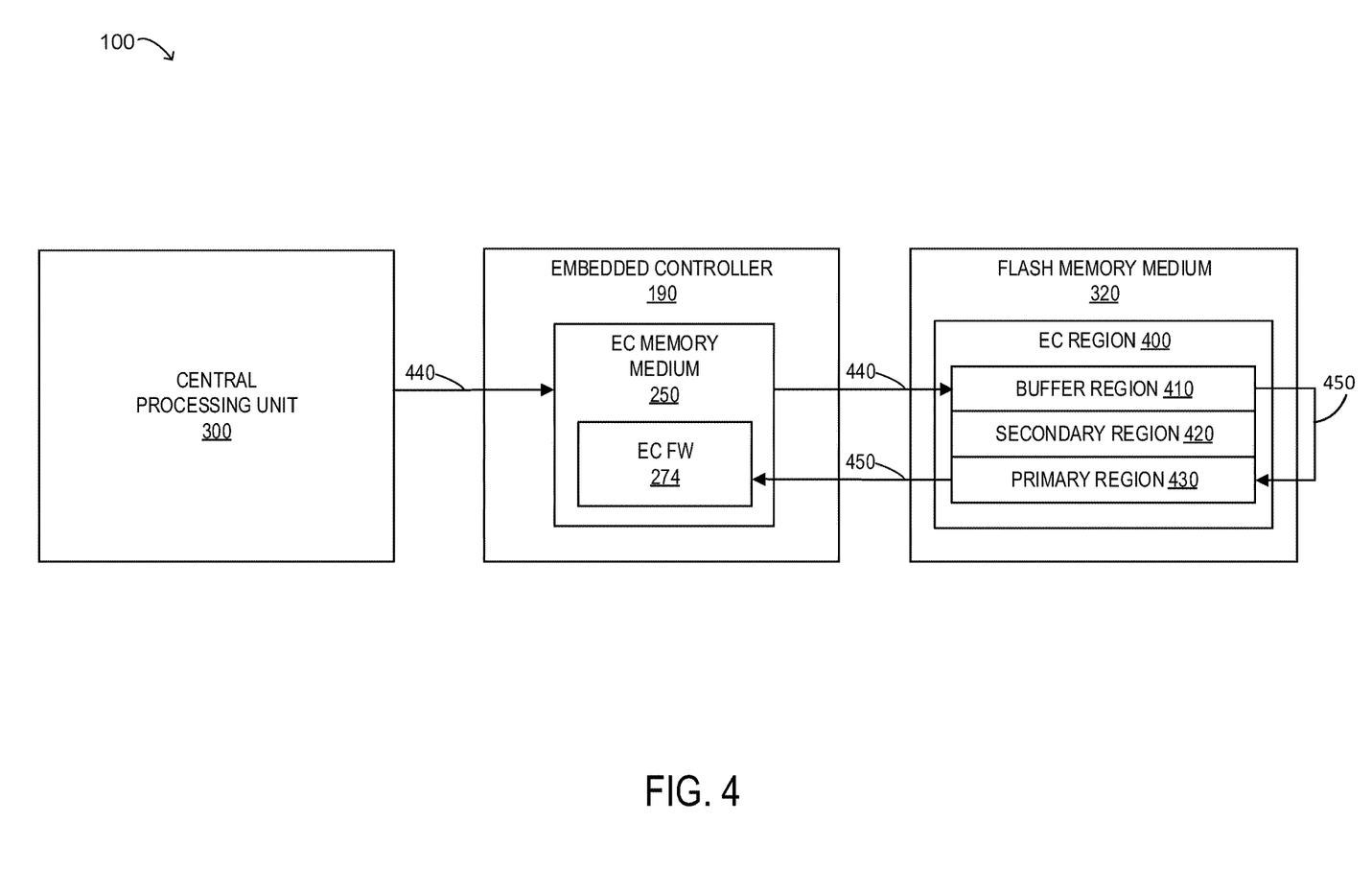
FIG. 4 illustrates a block diagram of selected elements of an embodiment for securing an embedded controller flashing process.

FIG. 4 illustrates a block diagram of selected elements of an embodiment for securing an embedded controller flashing process. In the embodiment illustrated in FIG. 4, IHS 100 includes CPU 300, EC 190, and flash memory medium 320. EC 190 includes EC memory medium 270 that further includes EC FW 274. Flash memory medium 320 includes an EC region 400 that further includes a buffer region 410, a secondary region 420, and a primary region 430.

In the embodiment illustrated in FIG. 4, CPU 300 can send flash command 440 to EC 190 where it may be temporarily stored in EC memory medium 250. However, EC memory medium 250 may have a limited address space such that EC memory medium 250 is unable to store an entire EC firmware update included in flash command 440. Therefore, flash command 440 may include an EC firmware update that is partitioned into multiple blocks of data (e.g., 1 KB data chucks) such that each block of data may include a portion of EC firmware update that has not yet been verified. EC 190 may then progressively send each portion of EC firmware update to flash memory medium 320 for verification. As shown in FIG. 4, EC 190 may progressively send each received portion of EC firmware update from EC memory medium 250 to buffer region 410 of EC region 400 in flash memory medium 320. Here, EC 190 may perform a verification process on the entire EC firmware update. If the EC firmware update cannot be verified by EC 190 in buffer region 410 (e.g., using SHA-256), the EC firmware update may be deleted from buffer region 410 and effectively removed from flash memory medium 320 altogether such that it will not be executed by EC 190.

In one embodiment, an EC firmware build server (not shown) may include a private encryption key, or "private key," used for asymmetric encryption with the public key 260 stored in EC 190 illustrated in FIG. 2. In one example, the code comprising an EC firmware update may be encrypted using the private key stored in the EC firmware build server and decrypted using the public key 260 stored in EC 190. Additionally, the EC firmware update may be cryptographically signed using the private key stored in the EC firmware build server and verified using the public key 260 stored in EC 190. In this way, EC 190 and the EC firmware build server can ensure that an EC firmware update is trusted and does not include malicious code that may be used for a "Denial of Service" attack, for example.

In one or more embodiments, a one-way hash function may be employed by EC 190 to verify the code comprising an EC firmware update. The one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a code measurement, a digital fingerprint, a message integrity check, a contraction function, a compression function, and/or a manipulation detection code, among others. Examples of one-way hash functions may include one or more of an Abreast Davies-Meyer, a Davies-Meyer, a GOST Hash, a N-HASH, a HAVAL, a SHA (secure hash algorithm) (e.g., SHA-1, SHA-2, SHA-3, SHA-256, etc.), and a SNEFRU, among others. In the one or more embodiments described herein, SHA-256 may be used to verify EC firmware updates.

In the embodiment illustrated in FIG. 4, once the EC firmware update has been verified in buffer region 410, EC 190 can send the verified EC firmware update 450 to primary region 430. That is, EC 190 may store the verified EC firmware update 450 in primary region 430 to be loaded and executed by EC 190 while a copy of the verified EC firmware update remains in buffer region 410. The copy of the verified EC firmware update in buffer region 410 may be used as backup if the verified EC firmware update 450 becomes corrupted or otherwise invalidated for use. In addition, secondary region 420 may also store a copy of the verified EC firmware update that can be used as backup if the verified EC firmware update 450 stored in primary region 430 becomes corrupted or otherwise invalidated for use. In one embodiment, rather than storing the verified EC firmware update 450 in primary region 430, EC 190 can simply redirect a pointer pointing to the address space of primary region 430 to point to the address space of buffer region 410. This may allow EC 190 to access the verified EC firmware update without requiring an additional write to flash memory medium 320 (i.e., primary region 430).

In the embodiment illustrated in FIG. 4, once the verified EC firmware update 450 has been stored in primary region 430, EC 190 can reboot and load the verified EC firmware update 450 into EC memory medium 250 to be executed. In particular, EC 190 can reboot which may prompt EC data 250 to locate the verified EC firmware update 450 using a pointer to primary region 430. Once located, EC 190 can reverify the verified EC firmware update 450 in primary region 430 using any of the verification methods described above. If the verified EC firmware update 450 can be reverified, EC 190 can load the verified EC firmware update 450 into EC FW 274 in EC memory medium 250 such that it may be executed by EC 190.

In one embodiment, if the verified EC firmware update 450 cannot be reverified (e.g., using SHA-256), EC 190 can locate and execute recovery software in secondary region 420. In particular, EC data 250 can locate recovery software stored in secondary region 420 using a pointer to secondary region 420 and can verify the recovery software using any of the verification methods described above. Once the recovery software has been verified, EC 190 can load the recovery software into EC memory medium 200 such that it may be executed. In one embodiment, recovery software may instruct EC 190 to retrieve the copy of the verified EC firmware update from buffer region 410, reverify the copy of the verified EC firmware update in the buffer region 410, and store the reverified copy of the verified EC firmware update in primary region 430. In another embodiment, recovery software may instruct EC 190 to request an additional EC firmware update from CPU 300 or another external non-volatile storage medium in computing environment 180. In this way, flash memory medium 320 may ensure that IHS 100 can boot despite receiving an EC firmware update that has been corrupted or otherwise invalidated for use.

Figure 5:
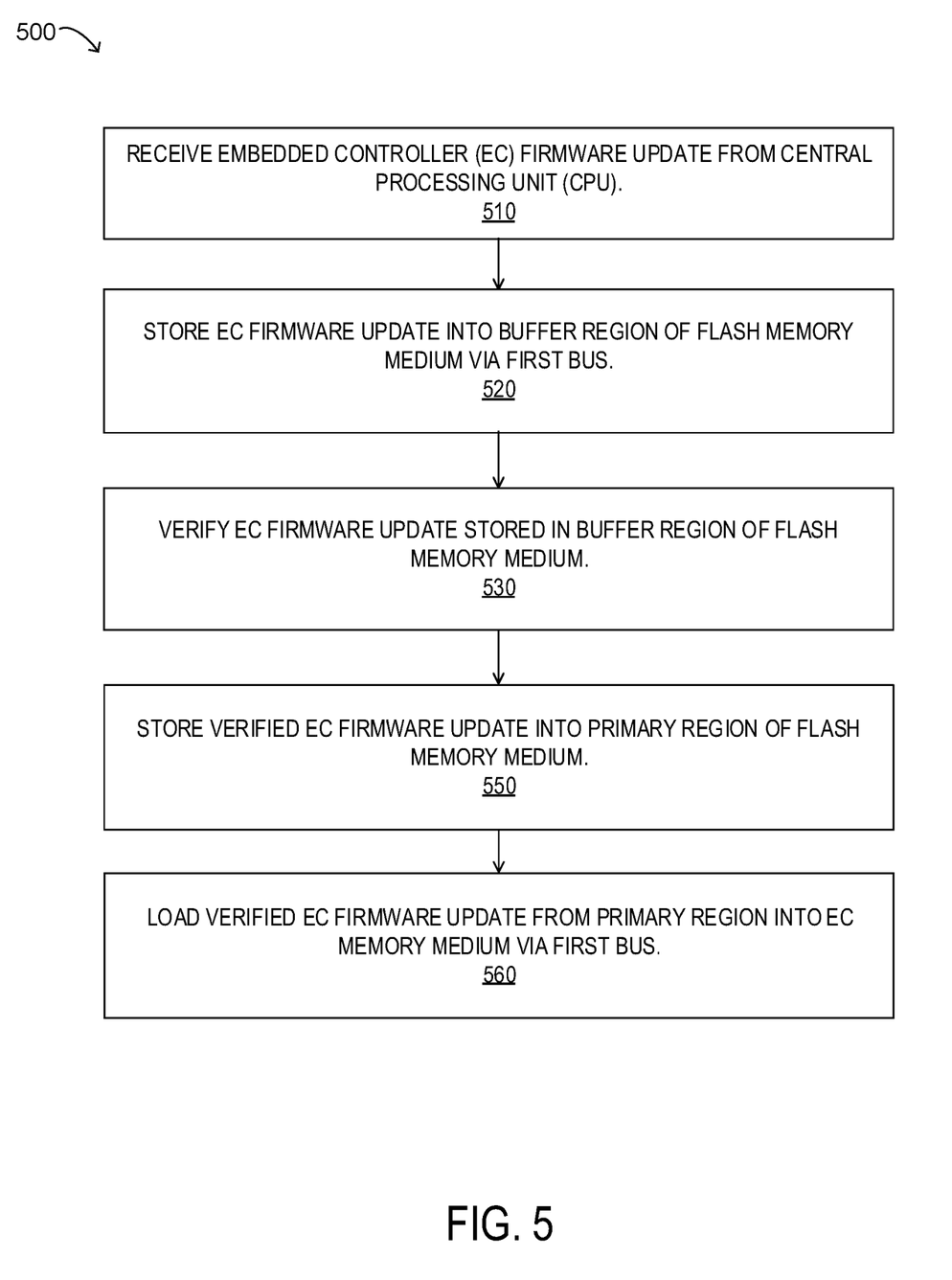
FIG. 5 illustrates a flowchart of selected elements of an embodiment of a method for securing an embedded controller flashing process.

FIG. 5 illustrates a flowchart of selected elements of an embodiment of a method 500 for securing an embedded controller flashing process. It is noted that certain operations described in method 500 may be optional or may be rearranged in different embodiments.

In the method 500 illustrated in FIG. 5, an embedded controller (EC) 190 can receive 410 an EC firmware update from a central processing unit (CPU) 300. The EC 190 can store 520 the EC firmware update into a buffer region 410 of flash memory medium 320 via bus 330. Bus 330 may communicatively couple EC 190 and flash memory medium 320 while PCH 310 is in tri-state. EC 190 can verify 530 the EC firmware update stored in buffer region 410 of flash memory medium 320 using any of the verification methods described above. In response to verifying the EC firmware update, EC 190 can store 550 the verified EC firmware update 450 into primary region 430 of flash memory medium 320. After rebooting and reverifying the verified EC firmware update 450, EC 190 can load 560 the verified EC firmware update 450 from primary region 430 of flash memory medium 320 into EC memory medium 200 via bus 340 such that it may be executed by EC 190.

Figure 6:
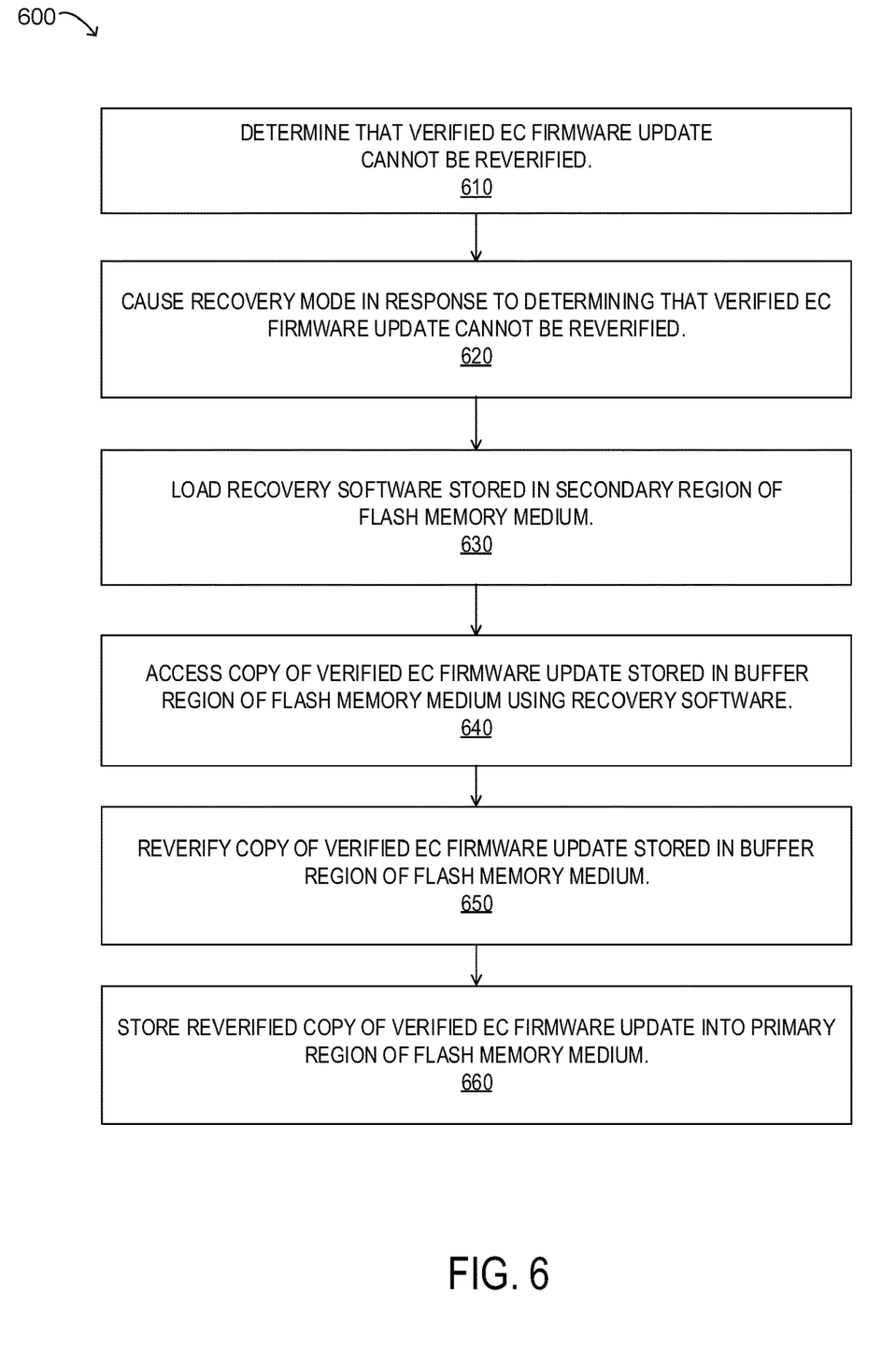
FIG. 6 illustrates a flowchart of selected elements of an embodiment of a method for a recovery process in response to determining that a verified EC firmware update cannot be reverified.

FIG. 6 illustrates a flowchart of selected elements of an embodiment of a method 600 for a recovery process in response to determining that the verified EC firmware update cannot be reverified. It is noted that certain operations described in method 600 may be optional or may be rearranged in different embodiments.

In the method 600 illustrated in FIG. 6, EC 190 may determine 610 that the verified EC firmware update stored in primary region 430 of flash memory medium 320 cannot be reverified. In response to determining that the verified EC firmware update cannot be reverified, EC 190 may cause 620 a recovery mode. While in recovery mode, EC 190 can load 630 recovery software stored in secondary region 420 of flash memory medium 320, access 640 the copy of the verified EC firmware update stored in buffer region 410 of flash memory medium 320, reverify 650 the copy of the verified EC firmware update stored in buffer region 410, and store 660 the reverified copy of the reverified EC firmware update into primary region 430 of flash memory medium 320.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, by an embedded controller (EC), an EC firmware update from a central processing unit (CPU);
storing, by the EC, the EC firmware update into a buffer region of a flash memory medium via a first bus, the first bus communicatively coupling the EC and the flash memory medium, wherein storing the EC firmware update into the buffer region comprises:
causing, by the EC, a high impedance state in an output port of a platform controller hub (PCH);
bypassing, by the EC, a second bus communicatively coupling the EC and the PCH; and
accessing, by the EC, the buffer region of the flash memory medium via the first bus communicatively coupling the EC and the flash memory medium; and
verifying, by the EC, the EC firmware update stored in the buffer region of the flash memory medium; and
in response to verifying the EC firmware update:
storing, by the EC, the verified EC firmware update into a primary region of the flash memory medium; and loading, by the EC, the verified EC firmware update from the primary region into an EC memory medium of the EC via the first bus.

2. The method of claim 1, wherein causing the high impedance state in the output port of the PCH comprises resetting the PCH.

3. The method of claim 1, wherein loading the verified EC firmware update from the primary region into the EC memory medium of the EC further comprises:
reverifying the verified EC firmware update, the reverifying responsive to an EC reboot.

4. The method of claim 3, further comprising:
determining that the verified EC firmware update cannot be reverified; and
in response to determining that the verified EC firmware update cannot be reverified:
causing a recovery mode comprising:
loading recovery software stored in a secondary region of the flash memory medium;
accessing a copy of the verified EC firmware update stored in the buffer region of the flash memory medium using the recovery software;
reverifying the copy of the verified EC firmware update stored in the buffer region of the flash memory medium; and
storing the reverified copy of the verified EC firmware update into the primary region of the flash memory medium.

5. The method of claim 1, further comprising:
determining that the EC firmware update in the buffer region of the flash memory medium cannot be verified; and
deleting the EC firmware update from the buffer region of the flash memory medium.

6. The method of claim 1, wherein verifying the EC firmware update in the buffer region comprises performing a cryptographic function.

7. A system comprising a processor having access to memory media storing instructions executable by the processor to perform operations comprising:
receiving, by an embedded controller (EC), an EC firmware update from a central processing unit (CPU);
storing, by the EC, the EC firmware update into a buffer region of a flash memory medium via a first bus, the first bus communicatively coupling the EC and the flash memory medium, wherein storing the EC firmware update into the buffer region comprises:
causing, by the EC, a high impedance state in an output port of a platform controller hub (PCH);
bypassing, by the EC, a second bus communicatively coupling the EC and the PCH; and
accessing, by the EC, the buffer region of the flash memory medium via the first bus communicatively coupling the EC and the flash memory medium; and
verifying, by the EC, the EC firmware update stored in the buffer region of the flash memory medium; and
in response to verifying the EC firmware update:
storing, by the EC, the verified EC firmware update into a primary region of the flash memory medium; and
loading, by the EC, the verified EC firmware update from the primary region into an EC memory medium of the EC via the first bus.

8. The system of claim 7, wherein causing the high impedance state in the output port of the PCH comprises resetting the PCH.

9. The system of claim 7, wherein loading the verified EC firmware update from the primary region into the EC memory medium of the EC further comprises:
reverifying the verified EC firmware update, the reverifying responsive to an EC reboot.

10. The system of claim 9, further comprising:
determining that the verified EC firmware update cannot be reverified; and
in response to determining that the verified EC firmware update cannot be reverified: causing a recovery mode comprising:
loading recovery software stored in a secondary region of the flash memory medium;
accessing a copy of the verified EC firmware update stored in the buffer region of the flash memory medium using the recovery software;
reverifying the copy of the verified EC firmware update stored in the buffer region of the flash memory medium; and
storing the reverified copy of the verified EC firmware update into the primary region of the flash memory medium.

11. The system of claim 7, further comprising:
determining that the EC firmware update in the buffer region of the flash memory medium cannot be verified; and
deleting the EC firmware update from the buffer region of the flash memory medium.

12. The system of claim 7, wherein verifying the EC firmware update in the buffer region comprises performing a cryptographic function.

13. A non-transitory computer-readable medium storing software comprising instructions executable by one or more computers which, upon such execution, cause the one or more computers to perform operations comprising:
receiving, by an embedded controller (EC), an EC firmware update from a central processing unit (CPU);
storing, by the EC, the EC firmware update into a buffer region of a flash memory medium via a first bus, the first bus communicatively coupling the EC and the flash memory medium, wherein storing the EC firmware update into the buffer region comprises:
causing, by the EC, a high impedance state in an output port of a platform controller hub (PCH);
bypassing, by the EC, a second bus communicatively coupling the EC and the PCH; and
accessing, by the EC, the buffer region of the flash memory medium via the first bus communicatively coupling the EC and the flash memory medium; and
verifying, by the EC, the EC firmware update stored in the buffer region of the flash memory medium; and
in response to verifying the EC firmware update:
storing, by the EC, the verified EC firmware update into a primary region of the flash memory medium; and
loading, by the EC, the verified EC firmware update from the primary region into an EC memory medium of the EC via the first bus.

14. The non-transitory computer-readable medium of claim 13, wherein causing the high impedance state in the output port of the PCH comprises resetting the PCH.

15. The non-transitory computer-readable medium of claim 13, wherein loading the verified EC firmware update from the primary region into the EC memory medium of the EC further comprises:
reverifying the verified EC firmware update, the reverifying responsive to an EC reboot.

16. The non-transitory computer-readable medium of claim 15, further comprising:
   determining that the verified EC firmware update cannot be reverified; and
   in response to determining that the verified EC firmware update cannot be reverified:
      causing a recovery mode comprising:
         loading recovery software stored in a secondary region of the flash memory medium;
         accessing a copy of the verified EC firmware update stored in the buffer region of the flash memory medium using the recovery software;
         reverifying the copy of the verified EC firmware update stored in the buffer region of the flash memory medium; and
         storing the reverified copy of the verified EC firmware update into the primary region of the flash memory medium.

17. The non-transitory computer-readable medium of claim 13, wherein verifying the EC firmware update in the buffer region comprises performing a cryptographic function.

* * * * *